Patented Nov. 30, 1937

2,100,594

UNITED STATES PATENT OFFICE 2,100,594

COLOR PHOTOGRAPHY

Gerd Heymer, Dessau-in-Anhalt, Germany, assignor to Agfa Ansco Corporation, Binghamton, N. Y., a corporation of New York No Drawing. Application October 21, 1933, Serial No. 694,689. In Great Britain May 5, 1932

6 Claims. (Cl. 95—88)

My present invention relates to color photography. It is a continuation-in-part of my application Ser. No. 646,703, filed Dec. 10, 1932.

One of its objects is to provide a process for the conversion of pictures having a silver image (herein referred to as "silver pictures") into pictures having an image in color (herein referred to as "color pictures"). Another object is the bath used for the conversion of the silver picture into the dyestuff picture. Further objects will be seen from the detailed specification following hereafter.

It is based on the observation that the azo-dyestuffs which are liable to reduction by an aqueous solution of sodium hydrosulfite have proved particularly suitable for the conversion of silver pictures into color pictures. However, not all of these dyestuffs yield good results, but essentially those of which the reaction products, formed after the treatment with a solution of sodium hydrosulfite, are soluble in water or aqueous solutions and do not quickly regenerate the dyestuff under the influence of oxygen. The photographic material is dyed with the azo-dyestuff according to known methods. As dyestuffs which are suitable for carrying out this invention there may be named, for instance, Congo Pure Blue (Schultz, Farbstofftabellen 1931, vol. 1, A. 513), Sirius Red-Violet R (cf. Schultz, Farbstofftabellen 7th Edn., vol. 2, page 198, lines 19–23), Sirius Ruby B (cf. Schultz, Farbstofftabellen, 7th Edn., vol. 2, page 198, lines 24–26), Benzo-Light Yellow (cf. Fierz-David "Künstliche organische Farbstoffe", 1926, page 168), Chrysophenin G or W (Schultz, Farbstofftabellen, 1923, 6th Edition No. 304) and Brilliant Benzo-Fast-Green (obtainable by diazotizing the azo-dyestuff from diazotized 2-naphthylamino-8-sulfonic acid and 1-amino-2-naphthol ethyl ether with sodium nitrite and hydrochloric acid, isolating the intermediate product formed and adding it in admixture with water to a solution of 1-acetylamino-8-naphthol-3:6-disulfonic acid which has been made alkaline by addition of sodium bicarbonate and to which pyridine has been added).

According to this invention, the layer dyed with a dyestuff of the kind above defined is subjected to the action of a reducing solution which contains a reducing agent whose reducing action is such that it does not reduce the dyestuff when used alone. Apparently the reducing agent is activated catalytically by the metallic silver, whereby the metallic silver is partially converted into an insoluble salt, that is to say, the metallic silver is oxidized. For instance, hydriodic acid does not reduce the above named dyestuffs, however, when finely divided silver is introduced into the reaction mixture, the dyestuffs are decolorized at the places where they are in contact with the silver particles, whilst simultaneously silver iodide is formed. The form in which the insoluble silver salt is produced is not without importance, inasmuch as the addition of a compound such as thiourea capable of forming a complex silver compound with the silver of the silver picture has proved suitable. Hydrobromic acid has an action similar to that of hydriodic acid. Therefore, there should be present in the reducing bath an agent which is adapted to form a complex compound with the silver of the silver picture. In this case, the complex silver compound acts as a catalyst and by this action the reduction of the dyestuff occurs with the solution of a reducing agent which would not reduce the dyestuff without the formation of the silver complex compound.

The following example illustrates the invention:

For the production of a red picture a positive is copied on to a photographic material provided with a light-sensitive silver halide emulsion layer dyed with Benzo Light-Red 8 BL (Schultz, Farbstofftabellen 1931, 6th Edition, No. 566). The dyestuff can be applied by bathing the photographic material in an aqueous solution of the dyestuff or in any other known manner. The exposed material is then developed, fixed in the usual manner and then treated in a bath obtained by mixing equal parts of

Solution I

| | | |
|---|---|---|
| Water | cc | 6250 |
| Iodine | grams | 17 |
| Potassium iodide | do | 33 |
| Concentrated sulfuric acid | cc | 525 | and

Solution II

| | | |
|---|---|---|
| Water | cc | 6250 |
| Sodium sulfite | grams | 330 |
| Thiourea | do | 330 |

This solution has the property of destroying the dyestuff at the places where the silver is deposited, and removing most of the silver, whilst it does not affect the unchanged silver bromide. Any silver which may remain after the bleaching operation is removed by treatment with an acidified solution of copper chloride, followed by a fixing operation. On account of this fixing operation, the fixing operation following the development, as hereinbefore described, can be omitted. The finished picture is a red positive. The photographic layer is preferably subjected to an intensive tanning operation.

The process of the invention is applicable not only to the production of a single color picture but for all purposes of color photography where colored photographic layers are used; for instance, several differently colored photographic layers can be treated simultaneously. It is possible to produce color pictures by the treatment of exposed photographic layers which have been dyed before exposure to light, as well as to dye a silver picture and to treat it as described in the foregoing example, whilst omitting the first developing and fixing operation.

What I claim is:

1. A solution for discharging dye in the presence of silver and dissolving a silver image in color photography which comprises equal parts of Solution I

| | | |
|---|---|---|
| Water | cc | 6250 |
| Iodine | grams | 17 |
| Potassium iodide | grams | 33 |
| Concentrated sulfuric acid | cc | 525 | and

Solution II

| | | |
|---|---|---|
| Water | cc | 6250 |
| Sodium sulfite | grams | 330 |
| Thiourea | grams | 330 |

2. A photographic process of producing a color picture which comprises copying a positive onto a photographic material provided with a sensitized silver halide emulsion layer dyed with Benzo-Light Red 8 BL, treating said exposed emulsion layer in a bath obtained by mixing equal parts of Solution I

| | | |
|---|---|---|
| Water | cc | 6250 |
| Iodine | grams | 17 |
| Potassium iodide | grams | 33 |
| Concentrated sulfuric acid | cc | 525 | and

Solution II

| | | |
|---|---|---|
| Water | cc | 6250 |
| Sodium sulfite | grams | 33 |
| Thiourea | grams | 33 | treating the picture with an acidified solution of copper chloride and subjecting the treated material to a fixing operation.

3. A process of producing a color picture which comprises copying a positive onto a photographic material provided with a sensitized silver halide emulsion layer dyed with an azo-dyestuff which is capable of being reduced to compounds which are water soluble and do not quickly regenerate the dyestuff under the influence of oxygen, treating the exposed emulsion layer with a solution containing a compound selected from the group consisting of hydrobromic and hydroiodic acid which is capable of reducing the dye in the presence of silver, a compound capable of forming a complex silver salt with the silver of the silver picture, and an acid, and subjecting the treated material to a fixing operation.

4. A process of producing a color picture which comprises copying a positive onto a photographic material provided with a sensitized silver halide emulsion layer dyed with an azo-dyestuff which is capable of being reduced to compounds which are water soluble and do not quickly regenerate the dyestuff under the influence of oxygen, treating the exposed emulsion layer with a solution containing a compound selected from the group consisting of hydrobromic and hydroiodic acid which is capable of reducing the dye in the presence of silver, a thiourea capable of forming a complex silver salt with the silver of the silver picture, and an acid, and subjecting the treated material to a fixing operation.

5. A solution for discharging dye in the presence of silver and dissolving a silver image, in color photography comprising a compound selected from the group consisting of hydrobromic and hydroiodic acid capable of reducing azo-dyestuffs in the presence of metallic silver, an agent capable of forming with the silver of the silver picture a complex silver salt, and an acid.

6. A solution for discharging dye in the presence of silver and dissolving a silver image, in color photography comprising a compound selected from the group consisting of hydrobromic and hydroiodic acid capable of reducing azo-dyestuffs in the presence of metallic silver, a thiourea capable of forming with the silver of the silver picture a complex silver salt, and an acid.

GERD HEYMER.